(12) United States Patent
Kim et al.

(10) Patent No.: US 7,746,426 B2
(45) Date of Patent: Jun. 29, 2010

(54) LIQUID CRYSTAL DISPLAY COMPRISING A WIDE VIEW POLARIZER

(75) Inventors: Sang-Woo Kim, Suwon-si (KR); Yi Li, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 212 days.

(21) Appl. No.: 11/874,651

(22) Filed: Oct. 18, 2007

(65) Prior Publication Data

US 2008/0094546 A1    Apr. 24, 2008

(30) Foreign Application Priority Data

Oct. 18, 2006    (KR) .................. 10-2006-0101243

(51) Int. Cl.
*G02F 1/1335* (2006.01)
(52) U.S. Cl. .................. 349/96; 349/117; 349/123
(58) Field of Classification Search ........... 349/96, 349/123, 179, 117
See application file for complete search history.

(56) References Cited

U.S. PATENT DOCUMENTS

| 5,986,733 | A | 11/1999 | Winker et al. | |
| 6,542,210 | B1* | 4/2003 | Wu | 349/119 |
| 6,567,143 | B1 | 5/2003 | VanderPloeg et al. | |
| 6,690,440 | B1* | 2/2004 | Nishiyama et al. | 349/129 |
| 6,995,824 | B2 | 2/2006 | Joten | |
| 2005/0151906 | A1* | 7/2005 | Yoshimi et al. | 349/118 |
| 2006/0103795 | A1 | 5/2006 | Ikeno et al. | |

FOREIGN PATENT DOCUMENTS

| JP | 09-101514 | 4/1997 |
| JP | 2002-107712 | 4/2002 |
| JP | 2004-085798 | 3/2004 |
| JP | 2005-107363 | 4/2005 |
| JP | 2005-201960 | 7/2005 |
| JP | 2005-208568 | 8/2005 |
| JP | 2006-098669 | 4/2006 |
| KR | 1020020024720 | 4/2002 |
| KR | 1020040027216 | 4/2004 |
| KR | 1020040069047 | 8/2004 |
| KR | 1020050060402 | 6/2005 |
| KR | 1020050082414 | 8/2005 |
| KR | 1020060001238 | 1/2006 |

* cited by examiner

*Primary Examiner*—Thoi V Duong
(74) *Attorney, Agent, or Firm*—Innovation Counsel LLP

(57) ABSTRACT

A liquid crystal display includes a first display panel including a first substrate and a lower alignment layer formed on the first substrate, a second display panel that includes a second substrate facing the first substrate to maintain a predetermined cell gap between the substrates and an upper alignment layer formed on the second substrate, a liquid crystal layer provided between the first and second display panels, a wide view polarizer and a lower polarizer sequentially attached to the outside of the first display panel, and an upper polarizer attached to the outside of the second display panel. An absorption axis of the wide view polarizer is inclined with respect to an absorption axis of the lower polarizer by 45°. An absorption axis C' inclined with respect to the absorption axis A' of the lower polarizer by 45° is interposed between the lower polarizer and the liquid crystal panel in the backlit electrically controlled birefringence (ECB) mode.

12 Claims, 7 Drawing Sheets

LIQUID CRYSTAL DISPLAY COMPRISING A WIDE VIEW POLARIZER

CROSS-REFERENCE TO RELATED APPLICATION

This application claims priority to and the benefit of Korean Patent Application No. 10-2006-0101243 filed in the Korean Intellectual Property Office on Oct. 18, 2006, the entire contents of which are incorporated herein by reference.

BACKGROUND OF THE INVENTION

1. Field of the Invention

The present invention relates to a liquid crystal display.

2. Description of the Related Art

Currently, liquid crystal displays are one of the flat panel displays that are most widely used. A liquid crystal display includes two display panels on which field generating electrodes, such as pixel electrodes and a common electrode, are formed with a liquid crystal layer interposed between them. When a voltage is applied to the field generating electrodes to generate an electric field, the alignment of liquid crystal molecules is determined and controls the polarization of incident light to display images.

Liquid crystal displays are classified as backlit liquid crystal displays that use a separate backlight as a light source, and reflective liquid crystal displays that reflect external light. A transreflective liquid crystal display, which can be converted into a reflective or backlit liquid crystal display according to demand, has been developed in recent years.

Liquid crystal displays may be classified according to mode as vertical align (VA) mode, twisted nematic (TN) mode, electrically controlled birefringence (ECB) mode on the basis of the characteristics of the liquid crystal. The transmittance of the liquid crystal in the ECB mode is higher than that of the liquid crystal in the TN mode.

However, the luminance of the liquid crystal display in the ECB mode is lower than that of the liquid crystal display in the TN mode. In addition, the viewing angle of the liquid crystal display in the ECB mode is also narrower than that of the liquid crystal display in the TN mode.

Further, the liquid crystal display in the ECB mode is generally provided in the form of a transflective liquid crystal display in order to maximize the transmittance of the liquid crystal display. However, the transreflective liquid crystal display should be manufactured in a production line in which both reflective and backlit liquid crystal displays are produced. For this reason, the process of manufacturing the transflective liquid crystal display is complicated, and more time is required to manufacture the transflective liquid crystal display.

SUMMARY OF THE INVENTION

According to an exemplary embodiment of the present invention, a liquid crystal display having a wide view electrically-controlled birefringence (ECB) mode includes a first display panel including a first substrate and a lower alignment layer formed on the first substrate, a second display panel that includes a second substrate facing the first substrate to maintain a predetermined cell gap between the substrates and an upper alignment layer formed on the second substrate, a liquid crystal layer provided between the first and second display panels, a wide view polarizer and a lower polarizer sequentially attached to the outside of the first display panel, and an upper polarizer attached to the outside of the second display panel. The absorption axis of the wide view polarizer is inclined with respect to an absorption axis of the lower polarizer by 45°.

Further, the lower rubbing axis of the lower alignment layer may be reversed and parallel to the rubbing axis of the upper alignment layer. Furthermore, the lower rubbing axis may be reversed and parallel to the absorption axis of the wide view polarizer. In addition, the liquid crystal layer may be formed of liquid crystal, which has positive refractive anisotropy, in an electrically controlled birefringence (ECB) mode. The wide view polarizer may include a compensation film and wide view supporters, and the compensation film may be an O-plate.

According to another exemplary embodiment of the present invention, a liquid crystal display includes a first display panel including a first substrate and a lower alignment layer formed on the first substrate, a second display panel that includes a second substrate facing the first substrate to maintain a predetermined cell gap between the substrates and an upper alignment layer formed on the second substrate, a liquid crystal layer provided between the first and second display panels, a lower polarizer attached to the outside of the first display panel, and a wide view polarizer and an upper polarizer sequentially attached to the outside of the second display panel. The absorption axis of the wide view polarizer is inclined with respect to the absorption axis of the upper polarizer by 45°.

Further, a lower rubbing axis of the lower alignment layer may be reversed and parallel to a rubbing axis of the upper alignment layer. The upper rubbing axis may be reversed and parallel to the absorption axis of the wide view polarizer. The liquid crystal layer may be formed of liquid crystal that has positive refractive anisotropy, in an electrically controlled birefringence (ECB) mode. Further, the wide view polarizer may include a compensation film and wide view supporters, and the compensation film may be an O-plate.

DETAILED DESCRIPTION OF THE EMBODIMENTS

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display according to an exemplary embodiment of the present invention will be described in detail with reference to FIGS. 1 to 3.

Figure 1:
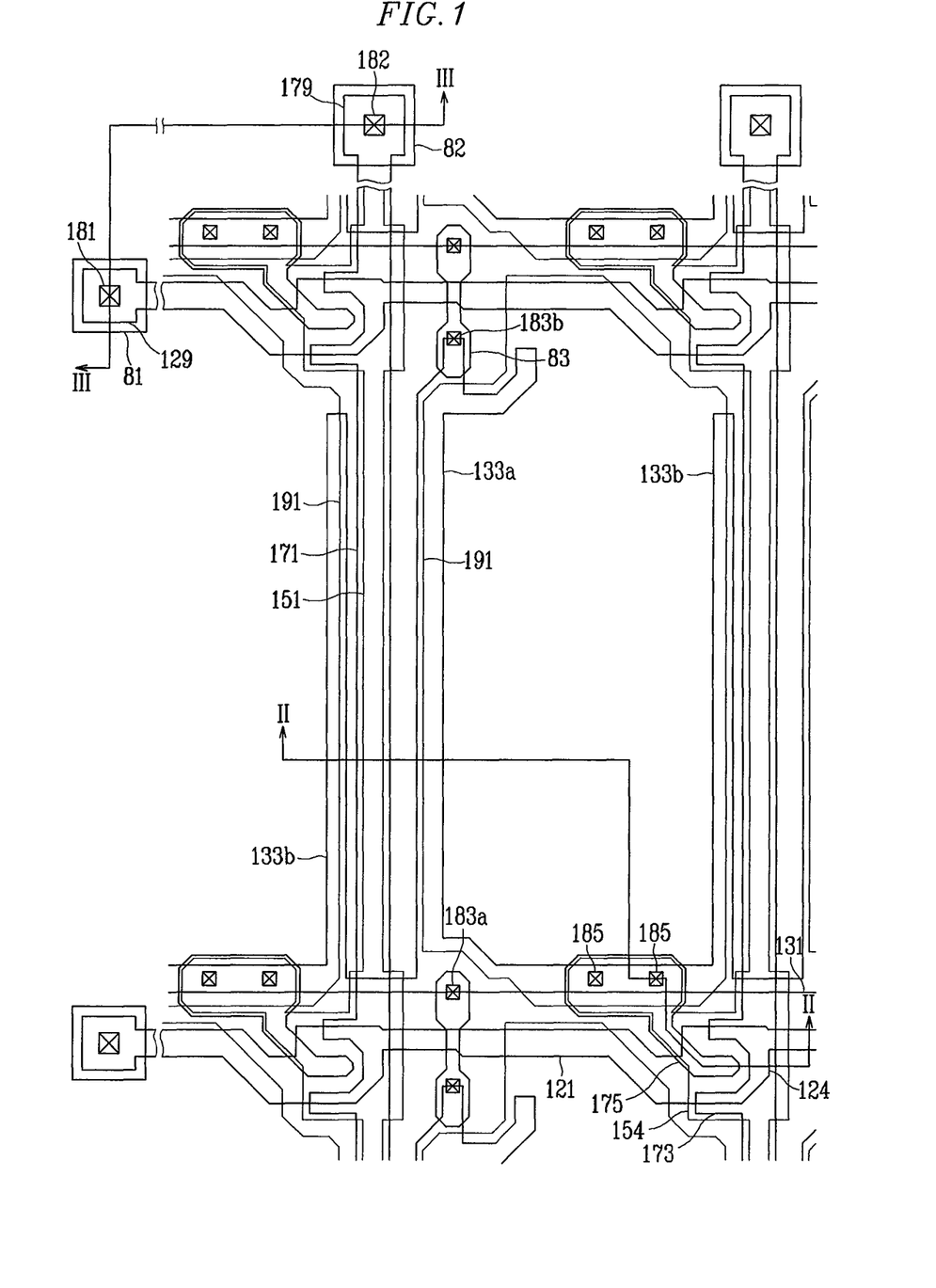
FIG. 1 is a layout view of a liquid crystal display according to an exemplary embodiment of the present invention.
Figure 2:
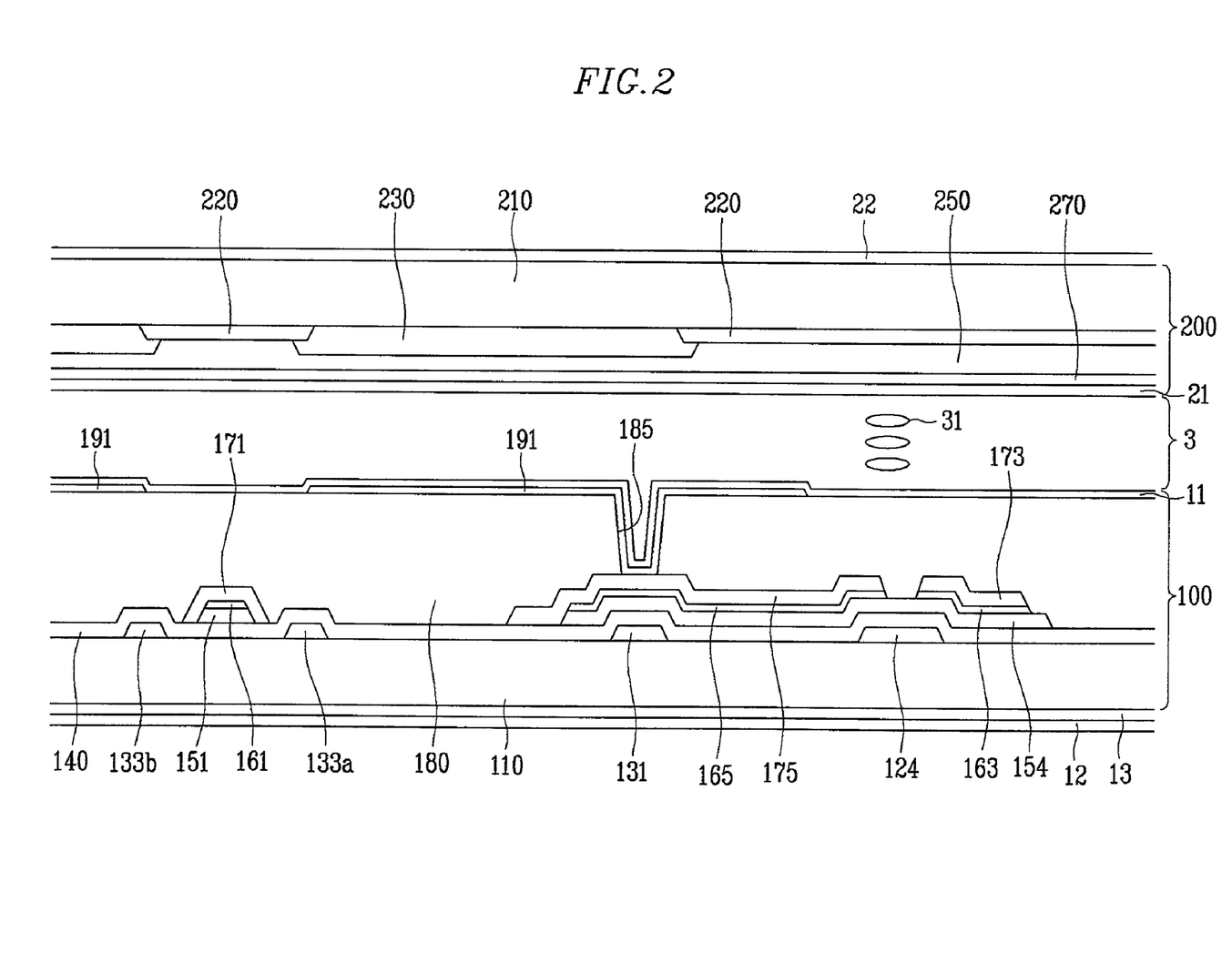
FIG. 2 is a cross-sectional view of the liquid crystal display shown in FIG. 1 taken along the line II-II.
Figure 3:
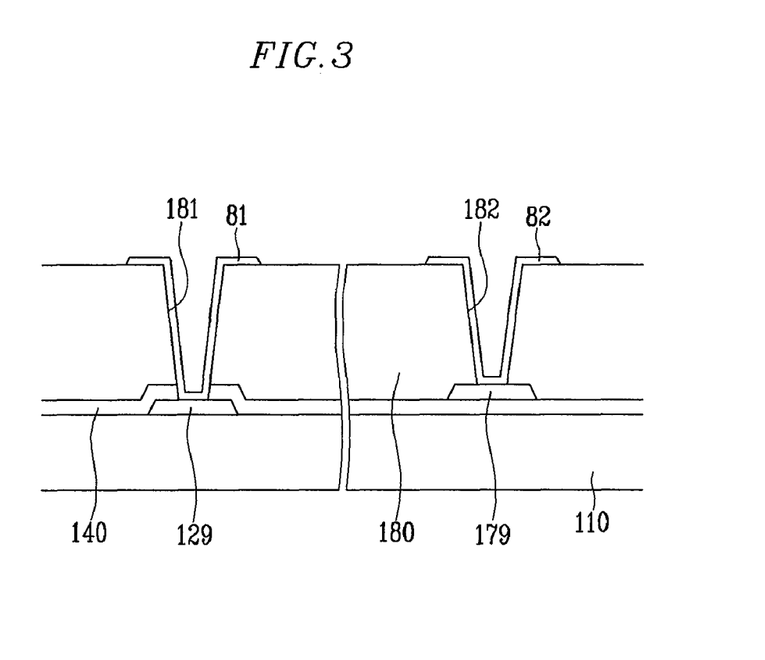
FIG. 3 is a cross-sectional view of the liquid crystal display shown in FIG. 1 taken along the line III-III.

FIG. 1 is a layout view of a liquid crystal display according to an exemplary embodiment of the present invention, FIG. 2 is a cross-sectional view of the liquid crystal display shown in FIG. 1 taken along a line II-II shown in FIG. 1, and FIG. 3 is a cross-sectional view of the liquid crystal display shown in FIG. 1, taken along the line III-III shown in FIG. 1.

A plurality of gate lines 121 and a plurality of storage electrode lines 131 are formed on an insulation substrate 110 that is made of transparent glass or plastic.

The gate lines 121 are used to transmit gate signals, and extend in a horizontal direction. Each of the gate lines 121 includes a plurality of gate electrodes 124 that protrude downward and an end portion 129 that has a large area so as to be connected to another layer or an external driving circuit. A gate driving circuit (not shown) for generating the gate signals may be mounted on a flexible printed circuit film (not shown) attached on the substrate 110, may be directly mounted on the substrate 110, or may be integrated into the substrate 110. When the gate driving circuit is integrated into the substrate 110, the gate lines 121 may extend so as to be directly connected to the gate driving circuit.

A predetermined voltage is applied to each of the storage electrode lines 131. Each of the storage electrode lines 131 includes a main line extending substantially parallel to the gate lines 121 and several pairs of first and second storage electrodes 133a and 133b branched from the line. Each of the storage electrode lines 131 is provided between two gate lines 121 adjacent to each other, and the main line is closer to the lower one of the two gate lines 121. Each of the storage electrodes 133a and 133b includes a fixed end connected to the main line and a free end opposite to the fixed end. The fixed end of the first storage electrode 133a has a large area, and the free end thereof is branched into two parts, that is, a linear part and a curved part. However, the shape and disposition of each storage electrode line 131 may be modified in various ways.

The gate lines 121 and the storage electrode lines 131 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), or titanium (Ti). Meanwhile, each of the gate lines and storage electrode lines may also have a multi-layered structure that includes two conductive layers (not shown) with different physical properties.

The side surfaces of the gate lines 121 and the storage electrode lines 131 are inclined with respect to the substrate 110, and it is preferable that an angle of inclination between each side surface and the substrate is in the range of about 30 to 80°.

A gate insulating layer 140, which is made of silicon nitride (SiNx) or silicon oxide (SiOx), is formed on the gate lines 121 and the storage electrode lines 131.

A plurality of semiconductor stripes 151 made of hydrogenated amorphous silicon (referred to as "a-Si") or polysilicon are formed on the gate insulating layer 140. The semiconductor stripes 151 extend substantially in a vertical direction, and include a plurality of projections 154 protruding toward the gate electrodes 124. Each of the semiconductor stripes 151 has a large width in the vicinity of the gate lines 121 and the storage electrode lines 131 so as to cover the gate lines 121 and the storage electrode lines 131.

A plurality of ohmic contact stripes and islands 161 and 165 are formed on the semiconductors 151. The ohmic contacts 161 and 165 may be made of n+ hydrogenated amorphous silicon in which n-type impurities, such as phosphorus, are doped at high concentration, or of silicide. The ohmic contact stripes 161 include a plurality of protrusions 163, and the protrusions 163 and the ohmic contact islands 165 are provided in pairs on the projections 154 of the semiconductors 151.

The side surfaces of the semiconductors 151 and 154 and the ohmic contacts 161 and 165 are inclined with respect to the substrate 110, and an angle of inclination between the side surface and the substrate 110 is in the range of about 30 to 80°.

A plurality of data lines 171 and a plurality of drain electrodes 175 are formed on the ohmic contacts 161 and 165 and the gate insulating layer 140.

The data lines 171 are used to transmit data signals, and extend substantially in a vertical direction so as to cross the gate lines 121 and the storage electrode lines 131. Each of the data lines 171 also crosses the storage electrode lines 131, and is provided between the storage electrodes 133a and 133b adjacent to each other. Each of the data lines 171 includes a plurality of source electrodes 173 that extend toward the gate electrodes 124 and an end portion 179 that has a large area so as to be connected to another layer or an external driving circuit. A data driving circuit (not shown) for generating data signals may be mounted on a flexible printed circuit film (not shown) attached on the substrate 110, may be directly mounted on the substrate 110, or may be integrated into the substrate 110. When the data driving circuit is integrated into the substrate 110, the data lines 171 may extend so as to be directly connected to the data driving circuit.

The drain electrodes 175 are separated from the data lines 171, and face the source electrodes 173 with the gate electrodes 124 therebetween. Each of the drain electrodes 175 includes one end portion having a large width and the other end portion having a bar shape. The one end portion having a large width overlaps the storage electrode 137, and the other end portion having a bar shape is partially surrounded by the bent source electrodes 173.

A gate electrode 124, a source electrode 173, a drain electrode 175, and a projection 154 of the semiconductor 151 form a thin film transistor (TFT), and a channel of the thin film transistor is provided to the projection 154 between the source electrode 173 and the drain electrode 175.

The data line 171 and the drain electrode 175 may be made of a refractory metal, such as molybdenum, chromium, tantalum, or titanium, or an alloy thereof, and they may have a multi-layered structure having a refractory metal layer (not shown) and a low-resistance conductive layer (not shown). A two-layered structure having a lower chromium or molybdenum (alloy) layer and an upper aluminum (alloy) layer, and a three-layered structure having a lower molybdenum (alloy) layer, an intermediate aluminum (alloy) layer, and an upper molybdenum (alloy) layer may be used as an example of the multi-layered structure. However, the data lines 171 and the drain electrodes 175 may be made of various metallic materials or conductors other than the above metallic materials.

It is preferable that the side surfaces of the data lines 171 and the drain electrodes 175 are inclined with respect to the substrate 110, and an angle of inclination between the side surface and the substrate is in the range of about 30 to 80°.

The ohmic contacts 161 and 165 are provided only between the semiconductors 151 and 154 and the data lines 171 and drain electrodes 175, and they lower the contact resistance between the semiconductors and the data lines and drain electrodes. The semiconductor stripes 151 are narrower than the data lines 171 at most positions. However, as described above, the semiconductor stripes 151 have large widths at the intersections between the gate lines 121 and the semiconductor stripes 151 so as to have smooth surface profiles. Accordingly, it is possible to prevent the data lines 171 from being disconnected. The semiconductors 151 and 154 have portions not covered with the data lines 171 and the drain electrodes 175 so as to be exposed to the outside, as well as portions between the source electrodes 173 and the drain electrodes 175.

A passivation layer 180 is formed on the data lines 171, the drain electrodes 175, and the portions of the semiconductors 151 and 154 exposed to the outside. The passivation layer 180 may be made of an inorganic or organic insulator, and may have a flat surface. Silicon nitride or silicon oxide may be used as an example of the inorganic insulator. The organic insulator may have photosensitivity, and it is preferable that the dielectric constant of the organic insulator is 4.0 or less. However, the passivation layer 180 may have a dual-layered structure, which includes a lower inorganic layer and an upper organic layer, to improve characteristics of the organic film and to protect the exposed semiconductors 151 and 154.

The passivation layer 180 includes a plurality of contact holes 182 and 185 that expose the end portions 179 of the data lines 171 and the drain electrodes 175, respectively. Furthermore, each of the passivation layer 180 and the gate insulating layer 140 includes a plurality of contact holes 181 that expose the end portions 129 of the gate lines, 121, a plurality of contact holes 183a that partially expose the storage electrode lines 131 in the vicinity of the fixed end of the first storage electrodes 133a, and a plurality of contact holes 183b that expose the protrusions of the free ends of the first storage electrodes 133a.

A plurality of pixel electrodes 191, a plurality of overpasses 83, and a plurality of contact assistants 81 and 82 are formed on the passivation layer 180. Each of the pixel electrodes, overpasses, and contact assistants may be made of a transparent conductive material such as ITO or IZO.

The pixel electrodes 191 are physically and electrically connected to the drain electrodes 175 through the contact holes 185, and data voltages are applied to the pixel electrodes 191 from the drain electrodes 175. The pixel electrodes 191 to which the data voltages are applied generate an electric field together with a common electrode 270 of a color filter display panel to which a common voltage is applied, so as to determine the alignment direction of the liquid crystal molecules of the liquid crystal layer 3 interposed between the electrodes 191 and 270. The polarization of light passing through the liquid crystal layer 3 depends on the alignment direction of the liquid crystal molecules determined as described above. The pixel electrode 191 and the common electrode 270 form a capacitor (hereinafter referred to as a "liquid crystal capacitor"), and maintain an applied voltage even after the thin film transistor is turned off.

The pixel electrode 191 and the drain electrode 175 connected to the pixel electrode 191 overlap the storage electrodes 133a and 133b and the storage electrode line 131. Further, the left and right sides of the pixel electrode 191 are closer to the data line 171 than the storage electrodes 133a and 133b. The pixel electrode 191 and the drain electrode 175 electrically connected to the pixel electrode 191 overlap the storage electrode line 131 so as to form a capacitor. The capacitor is referred to as a storage capacitor, and the storage capacitor improves the voltage holding performance of the liquid crystal capacitor.

The contact assistants 81 and 82 are connected to the end portion 129 of the gate line 121 and the end portion 179 of the data line 171 through the contact holes 181 and 182, respectively. The contact assistants 81 and 82 improve the adhesive property between the end portion 129 of the gate line 121 and an external device, and between the end portion 179 of the data line 171 and an external device. Further, the contact assistants 81 and 82 protect the end portion 129 of the gate line 121 and the end portion 179 of the data line 171.

The overpass 83 crosses the gate line 121, and is connected to the exposed portion of the storage electrode line 131 and the end portion of the free end of the storage electrode 133b through the contact holes 183a and 183b that are positioned on the both sides of the gate line 121. The storage electrodes 133a and 133b, the storage electrode line 131, and the overpass 83 may be used to repair a defective gate line 121, data line 171, or thin film transistor.

The color filter array panel 200 will be described below.

A light blocking member 220 is formed on an insulation substrate 210 made of, for example, transparent glass or plastic. The light blocking member 220 is also called a black matrix, and it defines a plurality of opening regions facing the pixel electrodes 191 and prevents light from leaking between the pixel electrodes 191.

In addition, a plurality of color filters 230 are formed on the substrate 210 so that almost all the color filters are disposed in the opening regions surrounded by the light blocking member 220. The color filters 230 are arrayed in stripe shapes along the pixel electrodes 191 in a vertical direction. Each of the color filters 230 can display one of three primary colors of red, green, and blue.

A planarization layer 250 is formed on the color filter 230 and the light blocking member 220, and the common electrode 270 is formed on the planarization layer 250. It is preferable that the common electrode 270 is made of a transparent conductive material such as ITO or IZO.

It is preferable that the liquid crystal layer 3 is formed of liquid crystal 31, which has positive refractive anisotropy, in an electrically controlled birefringence (ECB) mode, and that alignment layers 11 and 21 for aligning the liquid crystal layer 3 are formed on the inner surfaces of the display panels 100 and 200. Since each of the alignment layers 11 and 21 is a horizontal alignment layer, the liquid crystal 31 is laid between the lower alignment layer 11 and the upper alignment layer 21 in a horizontal direction. Further, the liquid crystal 31 is aligned in parallel without rotation, unlike a twisted nematic (TN) liquid crystal. Accordingly, when a voltage is not applied, the liquid crystal 31 in the electrically controlled birefringence mode is horizontally aligned in parallel with the substrates. When a voltage is applied, the liquid crystal 31 in the electrically controlled birefringence mode is vertically aligned.

A lower polarizer 12 and an upper polarizer 22 are attached to the outer surfaces of the display panel 100 and 200, respectively, and a wide view polarizer 13 is interposed between the lower polarizer 12 and the thin film transistor array panel 100. Each of the upper polarizer 22, the lower polarizer 12, and the wide view polarizer 13 has an absorption axis. Further, each of the upper polarizer 22, the lower polarizer 12, and the wide view polarizer 13 absorbs polarized light parallel to the absorption axis, and transmits polarized light perpendicular to the absorption axis.

Figure 4:
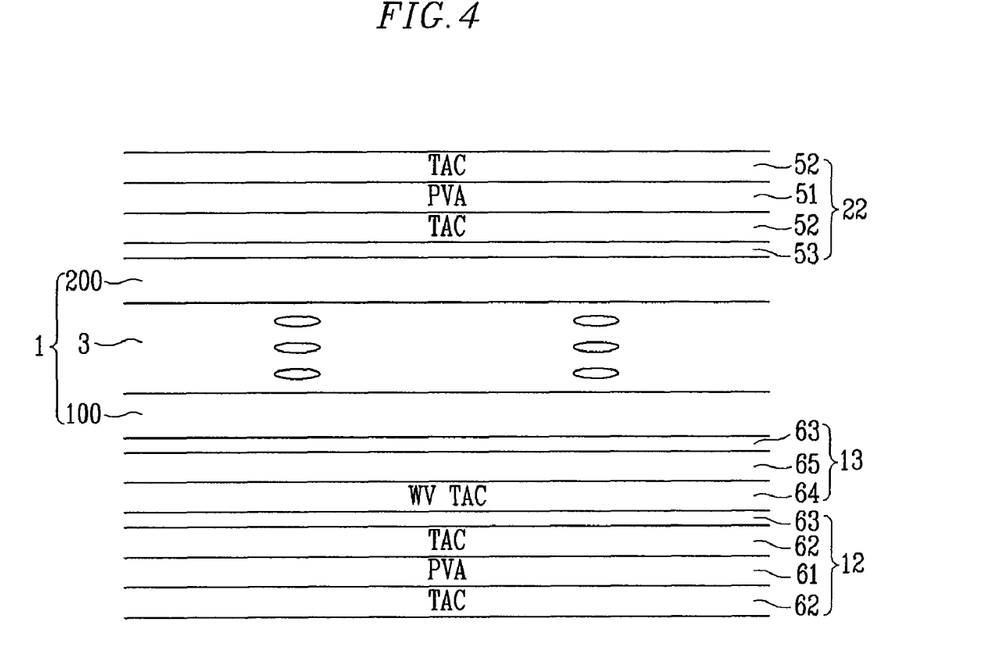
FIG. 4 is a detailed view illustrating the structure of a liquid crystal panel including display panels and a liquid crystal layer interposed therebetween, a lower polarizer, a wide view polarizer, and an upper polarizer.

FIG. 4 shows the detailed structure of a liquid crystal panel including display panels 100 and 200 and a liquid crystal layer 3 interposed therebetween, a lower polarizer 12, a wide view polarizer 13, and an upper polarizer 22.

As shown in FIG. 4, the upper polarizer 22 includes a polarization medium (polyvinyl alcohol, PVA) 51 and supporters (triacetate cellulose, TAC) 52. The polarization medium 51 controls the amount of transmitted light on the basis of the polarized light, and the supporters 52 are attached at both sides of the polarization medium 51 to protect and support the polarization medium 51. A passivation film may be formed on the upper polarizer 22 by an anti-glare process, an anti-reflection process, an anti-scratch process, or a hard coating process. An adhesive 53 is provided between the upper polarizer 22 and the liquid crystal panel 1 so that the upper polarizer 22 and the liquid crystal panel 1 are attached to each other. A pressure sensitive adhesive (PSA) may be used as the adhesive 53. When the pressure sensitive adhesive is used as the adhesive 53, objects are slightly pressed against each other so as to be attached to each other.

The lower polarizer 12 has a structure in which supporters (TAC) 62 are attached at both sides of a polarization medium (PVA) 61, and the wide view polarizer 13 has a structure in which a compensation film 65 is attached to a wide view supporter (WV TAC) 64. WV film series of Fuji film may be used as the wide view supporter (WV TAC) 64. An adhesive 63 is provided between the lower polarizer 12 and the wide view polarizer 13, and between the wide view polarizer 13 and the liquid crystal panel 1 so that the lower polarizer 12 and the wide view polarizer 13 are attached to each other and the wide view polarizer 13 and the liquid crystal panel 1 are attached to each other. A pressure sensitive adhesive (PSA) may be used as the adhesive 63. A passivation film may be formed on the lower polarizer 12 by an anti-glare process, an anti-reflection process, an anti-scratch process, or a hard coating process.

Further, the compensation film 65 may be formed of a discotic liquid crystal (DLC) coating film, and discotic liquid crystal molecules are vertically aligned on one surface of the substrate and horizontally aligned on the other surface of the substrate in the same direction. The liquid crystal molecules are continuously arrayed between both substrates every 90°, and an O-plate is typically used as the compensation film 65.

The compensation film 65 delays phases to ensure a viewing angle and to solve a problem of gray reversal.

Figure 5:
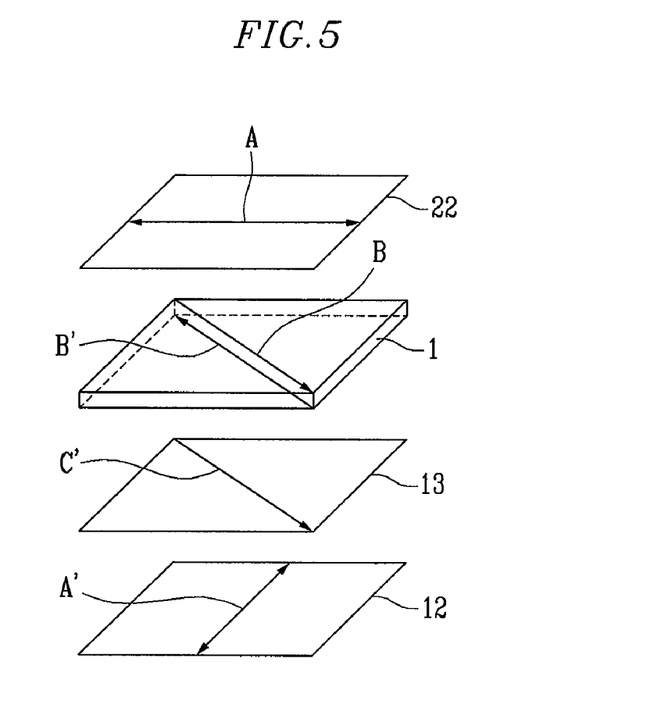
FIG. 5 is a perspective view illustrating the angular relationship between the polarizer and the alignment layer shown in FIGS. 2 and 4.
Figure 6:
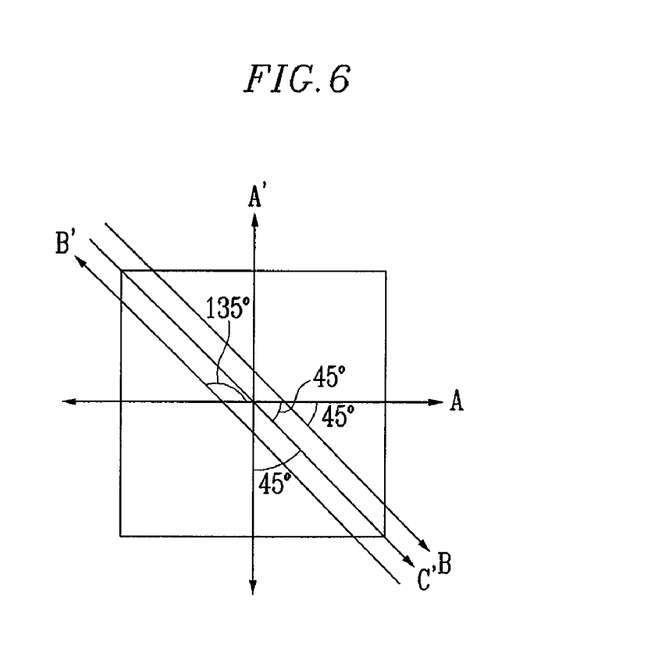
FIG. 6 is a view illustrating the angular relationship of a liquid crystal display shown in FIG. 5, as seen from above.

FIG. 5 is a perspective view illustrating the angular relationship between the polarizer and the alignment layer shown in FIGS. 2 and 4, and FIG. 6 is a view illustrating the angular relationship of a liquid crystal display shown in FIG. 5, as seen from above.

In FIGS. 5 and 6, line A means a direction of an absorption axis of the upper polarizer 22, and line B means a direction of an upper rubbing axis of the upper alignment layer 21. Further, line A' means a direction of an absorption axis of the lower polarizer 12, line B' means a direction of a lower rubbing axis of the lower alignment layer 11, and line C' means a direction of an absorption axis of the wide view polarizer 13.

The absorption axis A of the upper polarizer 22 is parallel to a horizontal direction, and the absorption axis A' of the lower polarizer 12 is inclined with respect to the horizontal direction by 90°. For this reason, the absorption axis A of the upper polarizer 22 is orthogonal to the absorption axis A' of the lower polarizer 12.

The upper rubbing axis B is inclined with respect to the horizontal direction by 45° in a clockwise direction, and the lower rubbing axis B' is reversed and parallel to the upper rubbing axis B.

Further, the absorption axis C' of the wide view polarizer 13 is reversed and parallel to the lower rubbing axis B'. Furthermore, the absorption axis C' of the wide view polarizer 13 is inclined with respect to the absorption axis A' of the lower polarizer 12 by 45°.

Since the wide view polarizer 13 is interposed between the lower polarizer 12 and the liquid crystal panel 1 as described above, it is possible to ensure a wide viewing angle and to compensate gray reversal.

While a cell gap is adjusted, the difference (Δnd) in phase, transmittance, color coordinate in a white state, and contrast ratio (C/R) are measured in the above-mentioned exemplary embodiment of the present invention. The measurement results thereof are shown in Table 1.

TABLE 1

| Cell gap | Δnd | Transmittance | White x | White y | C/R |
|---|---|---|---|---|---|
| 3.4 | 225.42 | 0.35119 | 0.29165 | 0.31291 | 712.964 |
| 3.5 | 232.05 | 0.36397 | 0.29335 | 0.31499 | 953.322 |
| 3.6 | 238.68 | 0.3759 | 0.29517 | 0.31722 | 1292.35 |
| 3.7 | 245.31 | 0.38691 | 0.29714 | 0.3196 | 1760.275 |
| 3.8 | 251.94 | 0.39692 | 0.29925 | 0.32212 | 2354.293 |
| 3.9 | 258.57 | 0.40589 | 0.3015 | 0.3248 | 2957.11 |
| 4 | 265.2 | 0.41376 | 0.30391 | 0.32764 | 3289.188 |
| 4.1 | 271.83 | 0.42049 | 0.30649 | 0.33063 | 3133.289 |
| 4.2 | 278.46 | 0.42605 | 0.30923 | 0.3338 | 2622.164 |
| 4.3 | 285.09 | 0.43041 | 0.31216 | 0.33713 | 2043.436 |
| 4.4 | 291.72 | 0.43353 | 0.31527 | 0.34063 | 1555.894 |

As shown in Table 1, when the cell gap is in the range of 3.8 to 4.1, it is possible to obtain the optimal contrast ratio.

Figure 7:
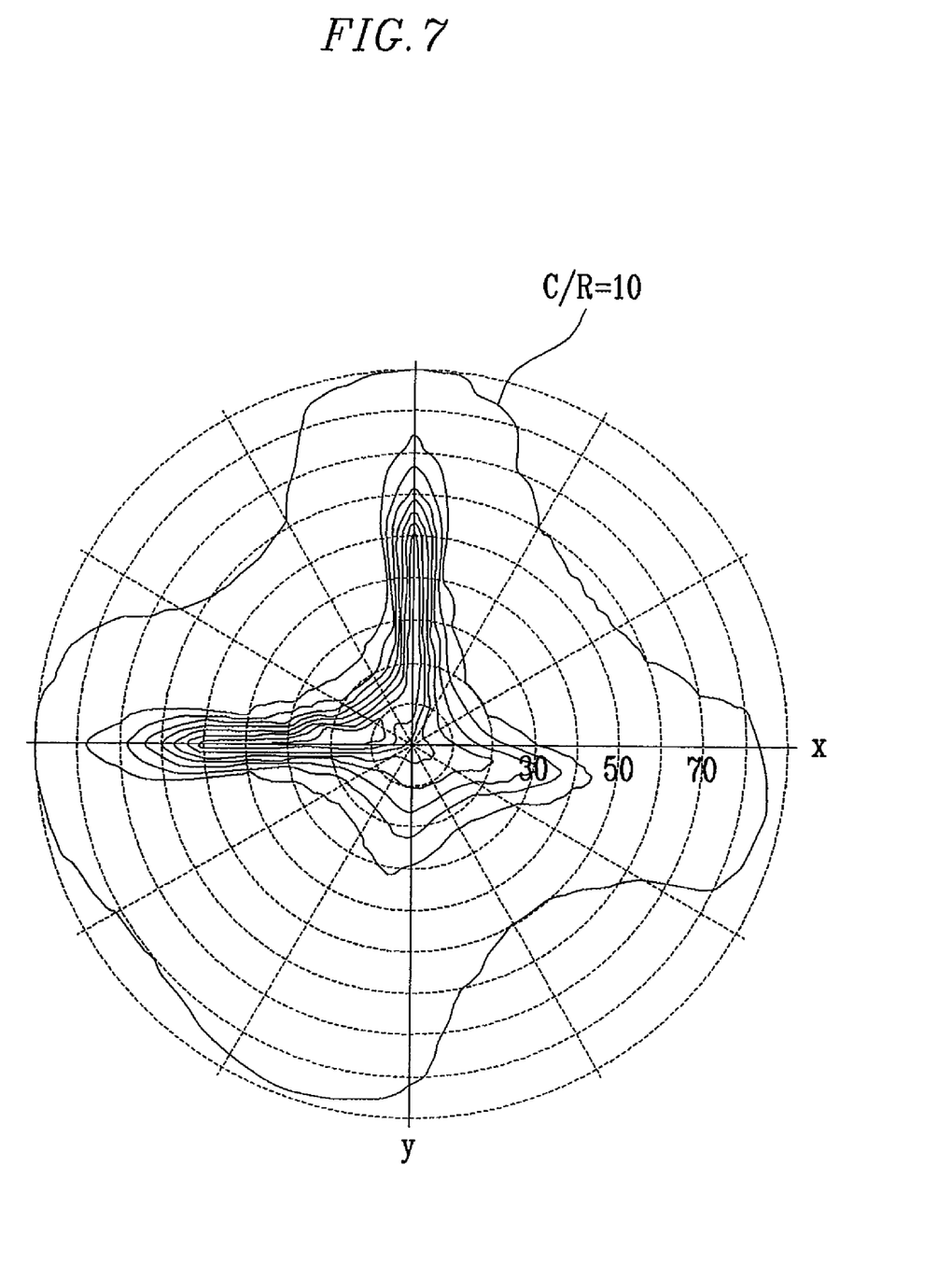
FIG. 7 is a view illustrating the three-dimensional optical characteristic obtained from a simulation of an exemplary embodiment shown in Table 1.

FIG. 7 is a view illustrating the three-dimensional optical characteristic obtained from the simulation of an exemplary embodiment shown in Table 1.

As shown in FIG. 7, when the contrast ratio (C/R) is 10, viewing angles are 90°, 80°, 90°, and 80° at upper, lower, left and right sides, respectively. Accordingly, it is possible to understand that wide viewing angles are obtained.

Figure 8:
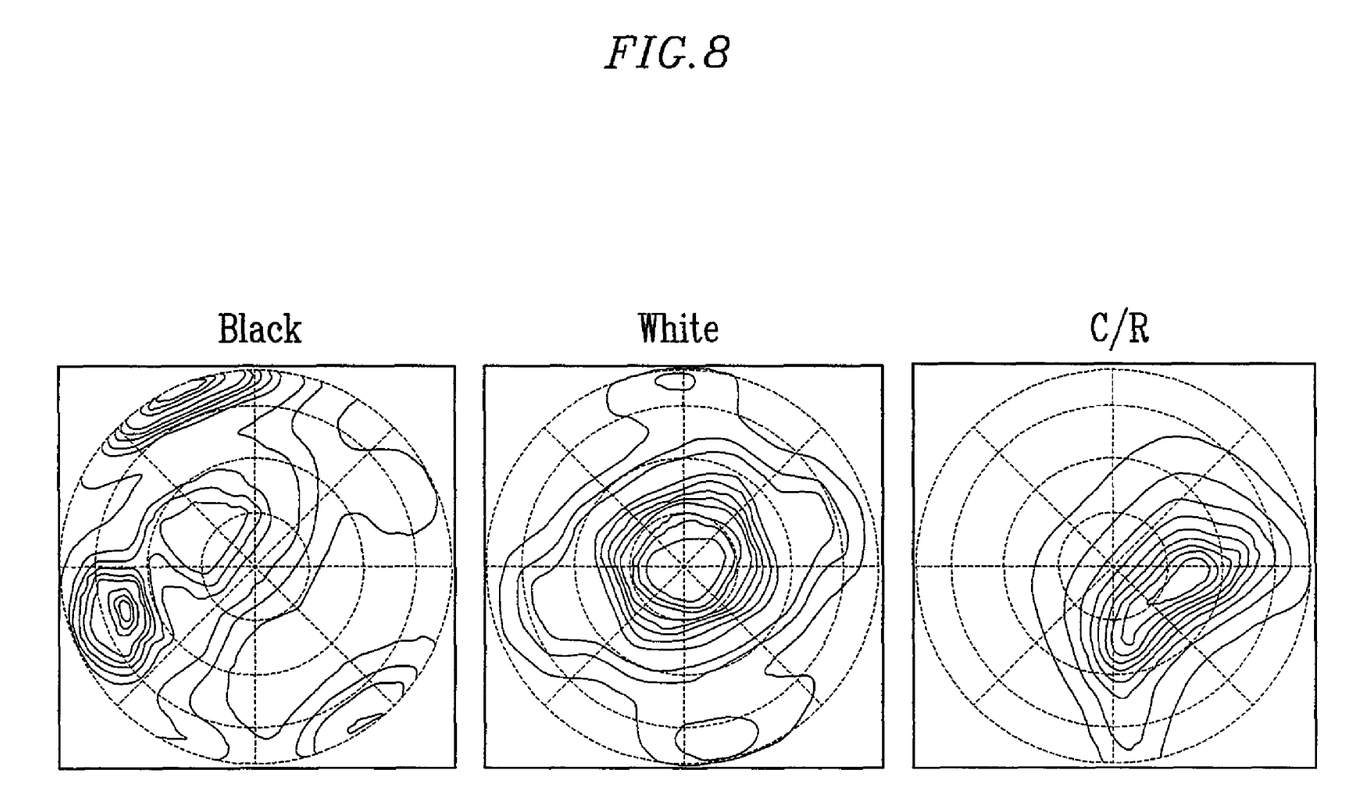
FIG. 8 is a view illustrating the three-dimensional optical characteristic obtained from measurement using a iconoscope while the difference (Δnd) in phase is set to 300.96 in the exemplary embodiment of the present invention, with a picture showing viewing angles in a black state, a picture showing viewing angles in a white state, and a view showing contrast ratios (C/R).

FIG. 8 is a view illustrating the three-dimensional optical characteristic obtained from measurement using a iconoscope while the difference (Δnd) in phase is set to 300.96 in the exemplary embodiment of the present invention, with a picture illustrating viewing angles in a black state, a picture illustrating viewing angles in a white state, and a view illustrating contrast ratios (C/R).

As shown in FIG. 8, it is possible to understand that the viewing angle is wide when the contrast ratio (C/R) is 10. Further, it is possible to confirm that the same results as the simulation results are obtained from the measurement.

As described above, the wide view polarizer 13, of which absorption axis C' is inclined with respect to the absorption axis A' of the lower polarizer 12 by 45°, is interposed between the lower polarizer 12 and the liquid crystal panel 1 in a backlit electrically controlled birefringence (ECB) mode. Accordingly, it is possible to ensure a wide viewing angle and to compensate gray reversal.

Figure 9:
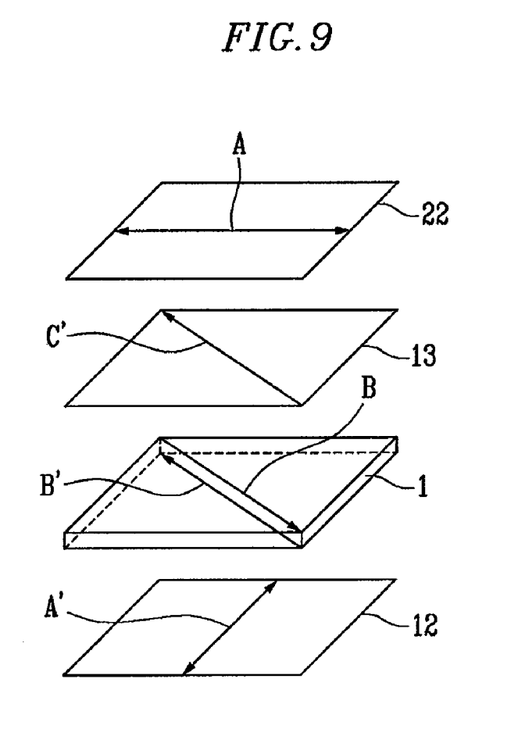
FIG. 9 is a perspective view illustrating the angular relationship between a polarizer and an alignment layer of a liquid crystal panel according to another exemplary embodiment of the present invention.
Figure 10:
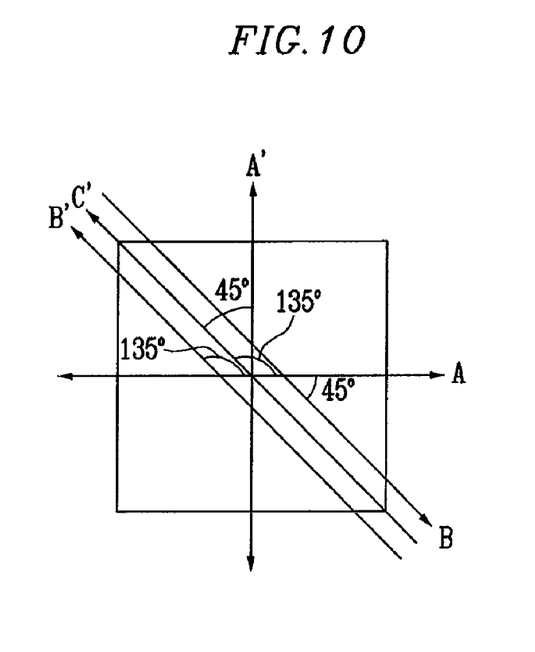
FIG. 10 is a view illustrating the angular relationship of the liquid crystal display shown in FIG. 9, as seen from above.

FIGS. 9 and 10 show a liquid crystal display according to another exemplary embodiment of the present invention.

FIG. 9 is a perspective view illustrating the angular relationship between a polarizer and an alignment layer of a liquid crystal panel according to another exemplary embodiment of the present invention, and FIG. 10 is a view illustrating the angular relationship of the liquid crystal display shown in FIG. 9, as seen from above.

As shown in FIGS. 9 and 10, the wide view polarizer 13 is interposed between the upper polarizer 22 and the liquid crystal panel 1, and the absorption axis C' of the wide view polarizer 13 is inclined with respect to the horizontal direction by 135° in a counterclockwise direction. For this reason, the absorption axis C' is reversed and parallel to the upper rubbing axis B, and the absorption axis C' of the wide view polarizer 13 is inclined with respect to the absorption axis A of the upper polarizer 22 by 45°.

Since the wide view polarizer 13 is interposed between the lower polarizer 22 and the liquid crystal panel 1 as described above, it is possible to ensure a wide viewing angle and to compensate gray reversal.

In the liquid crystal display according to an exemplary embodiment of the present invention, the wide view polarizer, of which absorption axis C' is inclined with respect to the absorption axis A' of the lower polarizer by 45°, is interposed between the lower polarizer and the liquid crystal panel in a backlit electrically controlled birefringence (ECB) mode. Accordingly, it is possible to ensure a wide viewing angle and to compensate gray reversal.

In addition, even if a backlit liquid crystal display is manufactured instead of the liquid crystal display of an electrically controlled birefringence (ECB) mode, it is possible to ensure a wide viewing angle and to compensate gray reversal. As a result, the liquid crystal display has a simpler manufacturing process as compared to a transflective liquid crystal display.

While this invention has been described in connection with what is presently considered to be practical exemplary embodiments, it will be apparent to those skilled in the art that various modifications and changes may be made thereto without departing from the scope and spirit of the invention. Accordingly, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first display panel including a first substrate and a lower alignment layer formed on the first substrate;
a second display panel including a second substrate and an upper alignment layer formed on the second substrate, the second substrate facing the first substrate to maintain a predetermined cell gap between the substrates;
a liquid crystal layer provided between the first and second display panels;
a wide view polarizer and a lower polarizer sequentially attached to the outside of the first display panel; and
an upper polarizer attached to the outside of the second display panel, wherein an absorption axis of the wide view polarizer is inclined with respect to an absorption axis of the lower polarizer by 45°.

2. The liquid crystal display of claim 1, wherein a lower rubbing axis of the lower alignment layer is reversed and parallel to a rubbing axis of the upper alignment layer.

3. The liquid crystal display of claim 2, wherein the lower rubbing axis is reversed and parallel to the absorption axis of the wide view polarizer.

4. The liquid crystal display of claim 3, wherein the liquid crystal layer is formed of liquid crystal that has positive refractive anisotropy.

5. The liquid crystal display of claim 4, wherein the wide view polarizer includes a compensation film and wide view supporters.

6. The liquid crystal display of claim 5, wherein the compensation film is an O-plate.

7. A liquid crystal display comprising:
a first display panel including a first substrate and a lower alignment layer formed on the first substrate;
a second display panel including a second substrate and an upper alignment layer formed on the second substrate, the second substrate facing the first substrate to maintain a predetermined cell gap between the substrates;
a liquid crystal layer provided between the first and second display panels;
a lower polarizer attached to the outside of the first display panel; and
a wide view polarizer and an upper polarizer sequentially attached to the outside of the second display panel,
wherein an absorption axis of the wide view polarizer is inclined with respect to an absorption axis of the upper polarizer by 45°.

8. The liquid crystal display of claim 7, wherein a lower rubbing axis of the lower alignment layer is reversed and parallel to an upper rubbing axis of the upper alignment layer.

9. The liquid crystal display of claim 8, wherein the upper rubbing axis is reversed and parallel to the absorption axis of the wide view polarizer.

10. The liquid crystal display of claim 9, wherein the liquid crystal layer is formed of liquid crystal, which has positive refractive anisotropy, in an electrically controlled birefringence (ECB) mode.

11. The liquid crystal display of claim 10, wherein the wide view polarizer includes a compensation film and wide view supporters.

12. The liquid crystal display of claim 11, wherein the compensation film is an O-plate.

* * * * *